United States Patent
Ootake et al.

(10) Patent No.: US 9,409,248 B2
(45) Date of Patent: *Aug. 9, 2016

(54) SCREEN PRINTER, COMPONENT MOUNTING LINE, AND SCREEN PRINTING METHOD

(71) Applicant: PANASONIC INTELLECTUAL PROPERTY MANAGEMENT CO., LTD., Osaka (JP)

(72) Inventors: Yuuji Ootake, Yamanashi (JP); Mitsuru Kouchi, Yamanashi (JP); Seiya Kuroda, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,638

(22) Filed: Nov. 20, 2014

(65) Prior Publication Data

US 2015/0144683 A1   May 28, 2015

(30) Foreign Application Priority Data

Nov. 22, 2013   (JP) .................. 2013-241597

(51) Int. Cl.
| | |
|---|---|
| *B41F 15/08* | (2006.01) |
| *B41F 15/26* | (2006.01) |
| *B41M 1/12* | (2006.01) |
| *B23K 3/06* | (2006.01) |
| *B23K 1/20* | (2006.01) |
| *B23K 37/04* | (2006.01) |

(52) U.S. Cl.
CPC ............. *B23K 3/0638* (2013.01); *B23K 1/20* (2013.01); *B23K 37/04* (2013.01); *B41F 15/08* (2013.01); *B41F 15/26* (2013.01); *B41M 1/12* (2013.01)

(58) Field of Classification Search
CPC ...... B41F 15/08; B41F 15/0881; B41F 15/12; B41F 15/16; B41F 15/20; B41F 15/18; B41F 15/26; B23K 37/04; B41M 1/12
USPC .......................................................... 101/126
See application file for complete search history.

(56) References Cited

FOREIGN PATENT DOCUMENTS

| JP | 2003-266629 A | | 9/2003 |
|---|---|---|---|
| JP | 2008006719 A | * | 1/2008 |
| JP | 2013031951 A | * | 2/2013 |

* cited by examiner

*Primary Examiner* — Leslie J Evanisko
(74) *Attorney, Agent, or Firm* — Pearne & Gordon LLP

(57) ABSTRACT

A screen printer includes a mask, a substrate holding unit that clamps and holds a substrate below the mask by clamping members, a substrate holding unit moving mechanism that moves the substrate holding unit to contact the substrate with a lower surface of the mask, a paste filling unit that fills pattern holes of the mask with a paste, mask suction portions provided in the clamping members which suck the mask contacted with the substrate. The mask suction portions keep sucking the mask when the substrate holding unit moving mechanism moves the substrate in a direction away from the mask to perform plate releasing, and release the suction of the mask in a state in which the mask sucked to the mask suction portions maintains a posture parallel to the substrate after the movement of the substrate is started.

4 Claims, 11 Drawing Sheets

SCREEN PRINTER, COMPONENT MOUNTING LINE, AND SCREEN PRINTING METHOD

CROSS REFERENCE TO RELATED APPLICATION(S)

The present disclosure relates to the subject matters contained in Japanese Patent Application No. 2013-241597 filed on Nov. 22, 2013, which are incorporated herein by reference in its entirety.

FIELD

One or more embodiments of the present invention relate to a screen printer, a component mounting line, and a screen printing method.

BACKGROUND

A component mounting line is provided with a screen printer which prints a paste such as solder on a substrate and a component mounting machine which mounts a component on the substrate on which the paste is printed by the screen printer. In the screen printer of such a component mounting line, a substrate clamped at the sides thereof by a pair of clamping members contacts with a lower surface of a mask having pattern holes formed thereon, a squeegee is slid on the mask contacted with the substrate to fill the pattern holes of the mask with a paste, and then the substrate is moved in a direction away from the mask to perform plate releasing (see Patent Document 1, for instance).

Patent Document 1 is JP-A-2003-266629.

SUMMARY

However, in recent years, the thickness of a mask has been reduced owing to refinement of a printing pattern associated with a fine-pitch substrate. Thus, since the mask closely contacted with a substrate upon filling of a paste is pulled toward the substrate in the subsequent plate releasing and the central portion of the mask is thus bent downward, directions in which pattern holes are formed with respect to the paste in end portions of the substrate are not perpendicular to the substrate, and thus the paste may lose its shape and printing accuracy may be reduced.

One of objects of the embodiment of the invention is to provide a screen printer, a component mounting line, and a screen printing method capable of securing good printing accuracy by preventing a paste from losing its shape in plate releasing.

A screen printer according to the embodiment includes: a mask that has pattern holes formed thereon; a substrate holding unit that clamps and holds a substrate at sides by a pair of clamping members below the mask; a substrate holding unit moving mechanism that moves the substrate holding unit holding the substrate to contact the substrate with a lower surface of the mask; a paste filling unit that fills, with a paste, the pattern holes of the mask contacted with the substrate by the substrate holding unit moving mechanism; mask suction portions that are provided in the pair of clamping members and that suck the mask being contacted with the substrate; and a control unit that controls the mask suction portions to keep sucking the mask when the substrate holding unit moving mechanism moves the substrate in a direction away from the mask to perform plate releasing after the pattern holes of the mask are filled with the paste, and to release the suction of the mask in a state in which the mask sucked to the mask suction portions maintains a posture parallel to the substrate after the movement of the substrate is started.

A component mounting line according to the embodiment includes: the screen printer according to the embodiments; and a component mounting machine that mounts a component on the substrate on which the paste is printed by the screen printer.

A screen printing method according to the embodiment includes: a substrate holding step of clamping and holding a substrate at sides by a pair of clamping members below a mask having pattern holes formed thereon; a contact step of contacting the substrate clamped and held by the clamping members with a lower surface of the mask; a paste filling step of filling, with a paste, the pattern holes of the mask contacted with the substrate; and a plate releasing step of performing plate releasing by moving the substrate in a direction away from the mask after the pattern holes of the mask are filled with the paste, wherein in the plate releasing step, when the substrate is moved in the direction away from the mask, mask suction portions provided in the pair of clamping members keep sucking the mask, and, after the movement of the substrate is started, the suction of the mask to the mask suction portions is released in a state in which the mask sucked to the mask suction portions maintains a posture parallel to the substrate.

According to the invention, it is possible to secure good printing accuracy by preventing a paste from losing its shape in plate releasing.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

Figure 1:
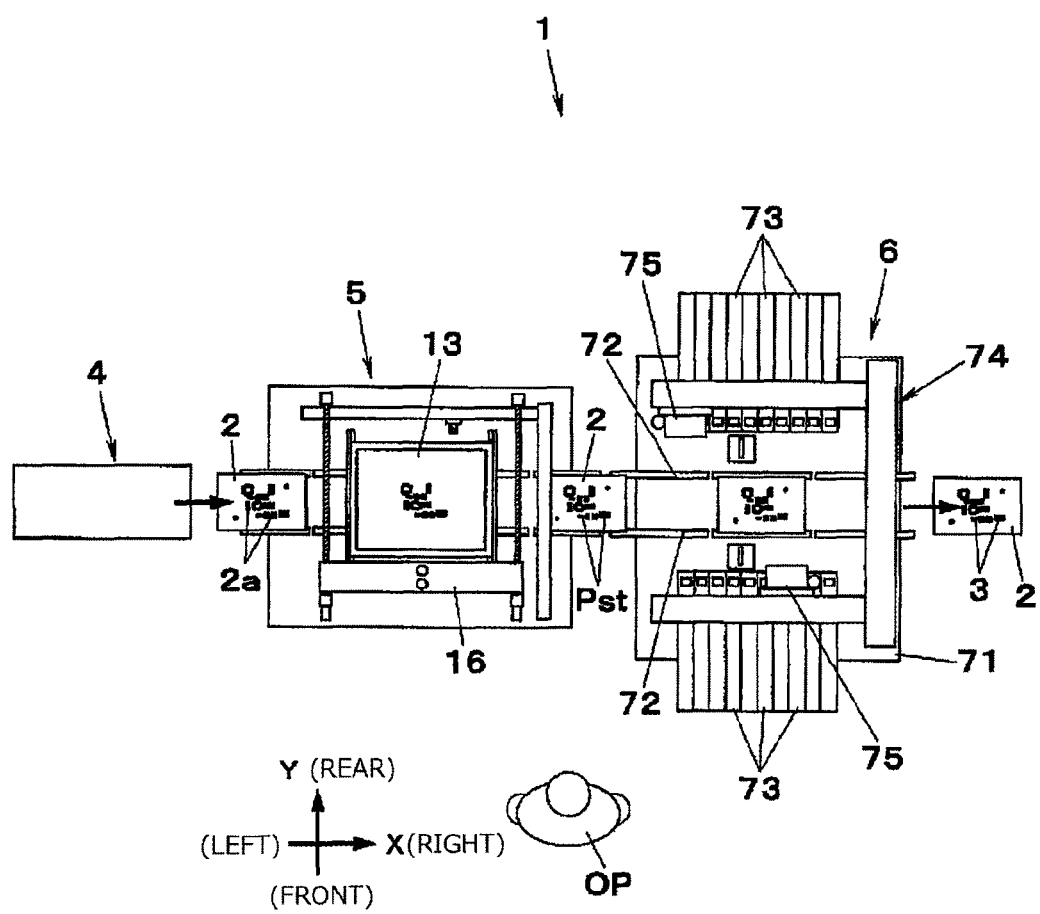
FIG. 1 is a schematic diagram of a configuration of a component mounting line of an embodiment of the invention.

Hereinafter, embodiments of the invention will be described with reference to the drawings. A component mounting line 1 shown in FIG. 1 is provided to manufacture a component mounting substrate by mounting a component 3 on a substrate 2, and is configured to include a screen printer 5 which performs screen printing with a paste Pst such as solder on electrodes 2a of the substrate 2 supplied from a substrate supply portion 4, and a component mounting machine 6 which mounts the component 3 on the substrate 2 on which the paste Pst is printed by the screen printer 5. In this embodiment, a direction in which the substrate 2 flows in the component mounting line 1 is a horizontal in-plane direction (a longitudinal direction viewed from an operator OP) from the left side toward the right side in FIG. 1, and is called an X-axis direction. A horizontal in-plane direction perpendicular to the X-axis direction (a front-back direction viewed from the operator OP) is called a Y-axis direction, and a vertical direction is called a Z-axis direction. In this embodiment, the left side of the plane of FIG. 1 corresponds to the upstream side of the flow of the substrate 2 (upstream process side), and the right side of the plane of FIG. 1 corresponds to the downstream side of the flow of the substrate (downstream process side).

Figure 2:
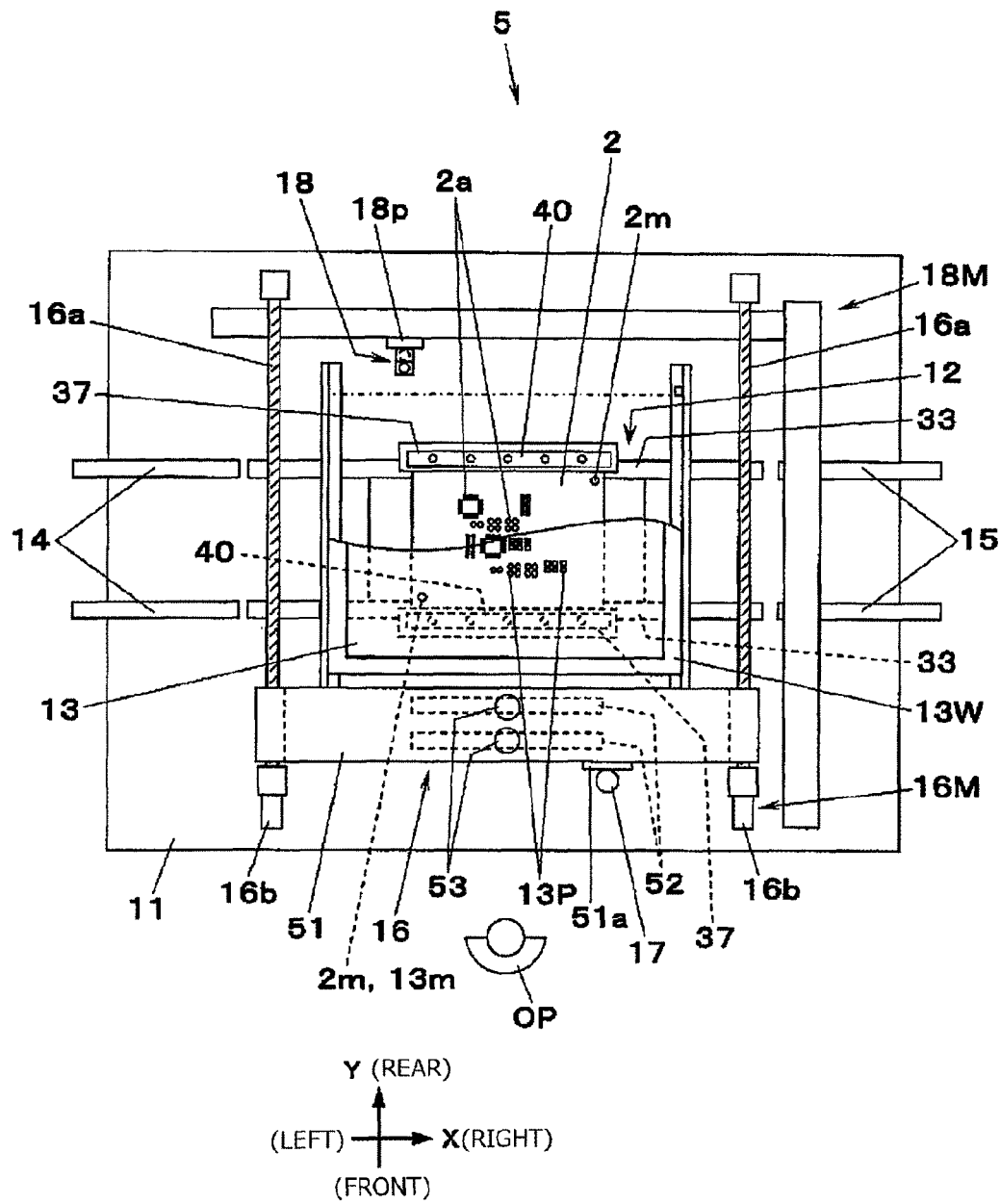
FIG. 2 is a plan view of a screen printer constituting the component mounting line of the embodiment of the invention.
Figure 3:
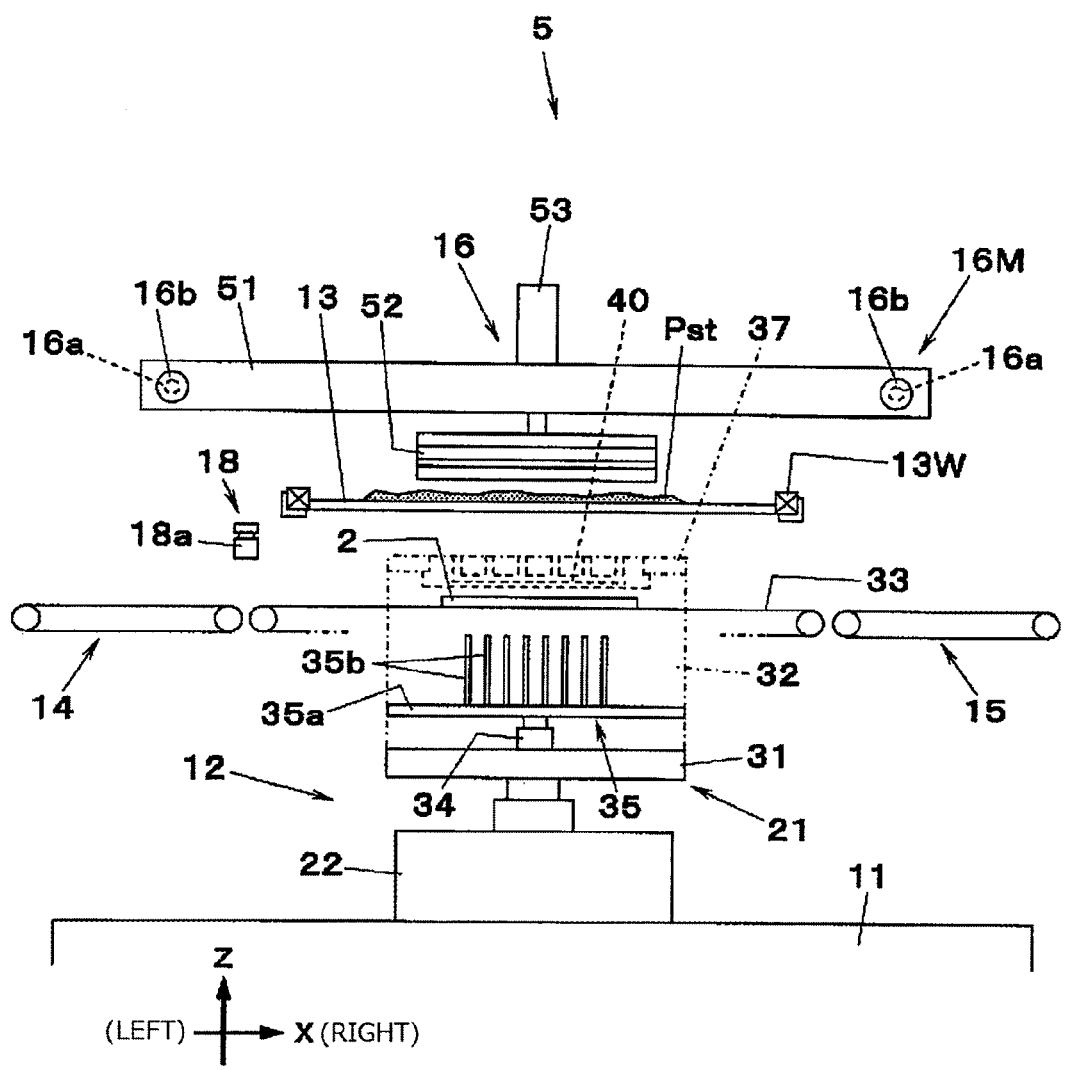
FIG. 3 is a front view of the screen printer of the embodiment of the invention.
Figure 4:
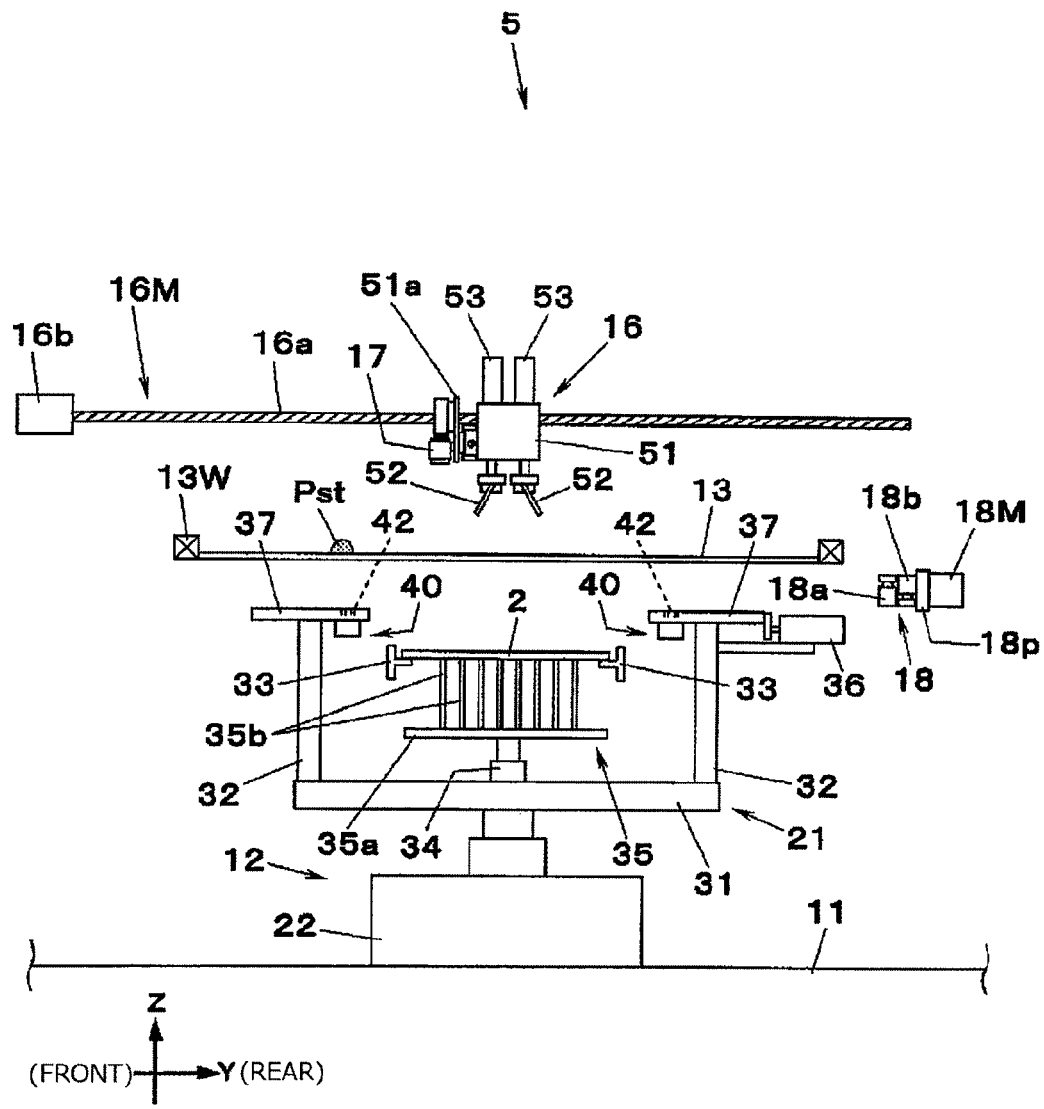
FIG. 4 is a side view of the screen printer of the embodiment of the invention.

In FIGS. 2, 3, and 4, the screen printer 5 is provided with a substrate holding and moving mechanism 12 on a base 11, and a mask 13 is installed above the substrate holding and moving mechanism 12. On the upstream side of the flow of the substrate 2 of the substrate holding and moving mechanism 12 on the base 11 (on the left sides of the planes of FIGS. 2 and 3), a feeding conveyor 14 as a substrate feeding portion which transfers the substrate 2 fed from another device (here, the substrate supply portion 4) on the upstream process side to the substrate holding and moving mechanism 12 is provided, and on the downstream side of the flow of the substrate 2 of the substrate holding and moving mechanism 12 on the base 11 (on the right sides of the planes of FIGS. 2 and 3), a discharge conveyor 15 as a substrate discharge portion which receives the substrate 2 sent from the substrate holding and moving mechanism 12 and discharges the substrate 2 to another device (here, the component mounting machine 6) on the downstream process side is provided. The screen printer 5 is provided with, above the mask 13, a printing head 16 which is moved by a printing head moving mechanism 16M and a paste supply syringe 17 which is provided integrally with the printing head 16, and is provided with, below the mask 13, a camera unit 18 as imaging means which is moved in the horizontal plane by a camera unit moving mechanism 18M.

In FIGS. 3 and 4, the substrate holding and moving mechanism 12 is formed of a substrate holding unit 21 which holds the substrate 2 and a substrate holding unit moving mechanism 22 which moves the substrate holding unit 21 in the horizontal in-plane direction (in the X-Y plane) and in the vertical (Z-axis) direction. The substrate holding unit 21 is provided with an elevation plate 31 which becomes a base, a pair of front and rear conveyor support members 32 extending upward from the elevation plate 31, a pair of front and rear conveyors 33 (also see FIG. 2) which are attached to the conveyor support members 32, a lower receiving portion 35 which is moved up and down above the elevation plate 31 by an elevation actuator 34 attached to the elevation plate 31, and a pair of front and rear clamping members 37 (also see FIG. 2) which are provided above the conveyors 33 and are opened or closed by a clamping member drive motor 36 in the Y-axis direction.

Figure 5:
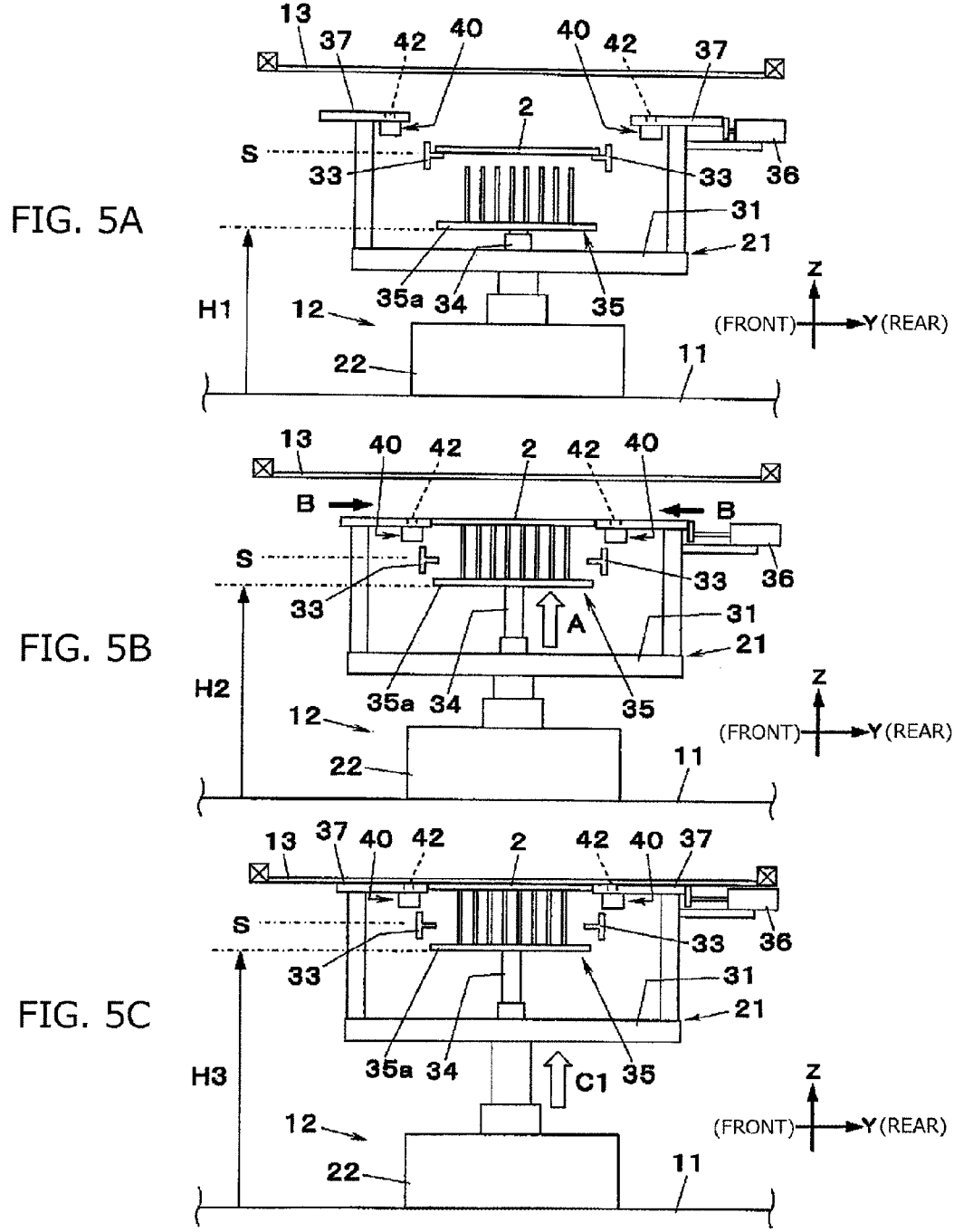
FIGS. 5A, 5B, and 5C are diagrams illustrating operations of the screen printer of the embodiment of the invention.

In FIGS. 3 and 4, the lower receiving portion 35 is formed of a base table 35a which is moved up and down by the elevation actuator 34 and a plurality of lower receiving pins 35b which are provided to extend upward from an upper surface of the base table 35a. The base table 35a of the lower receiving portion 35 reaches a height of H1 at a first position where the substrate holding unit moving mechanism 22 does not push the substrate holding unit 21 upward and the elevation actuator 34 does not also push the lower receiving portion 35 upward (FIG. 5A), reaches a height of H2 at a second position where the substrate holding unit moving mechanism 22 does not push the substrate holding unit 21 upward and the elevation actuator 34 pushes the lower receiving portion 35 upward, and reaches a height of H3 at a third position where the substrate holding unit moving mechanism 22 pushes the substrate holding unit 21 upward in a state in which the elevation actuator 34 pushes the lower receiving portion 35 upward (FIG. 5C). FIGS. 3 and 4 show a state in which the base table 35a is positioned at the first position.

In FIG. 2, the mask 13 has a rectangular flat plate shape extending in the X-Y plane, and an outer circumference thereof is supported by a frame member 13W. The mask 13 has pattern holes 13P formed in an arrangement corresponding to the arrangement of the electrodes 2a of the substrate 2. A pair of substrate-side marks 2m are provided at a diagonal position of the substrate 2, and a pair of mask-side marks 13m are provided corresponding to the substrate-side marks 2m on the mask 13.

Figure 6:
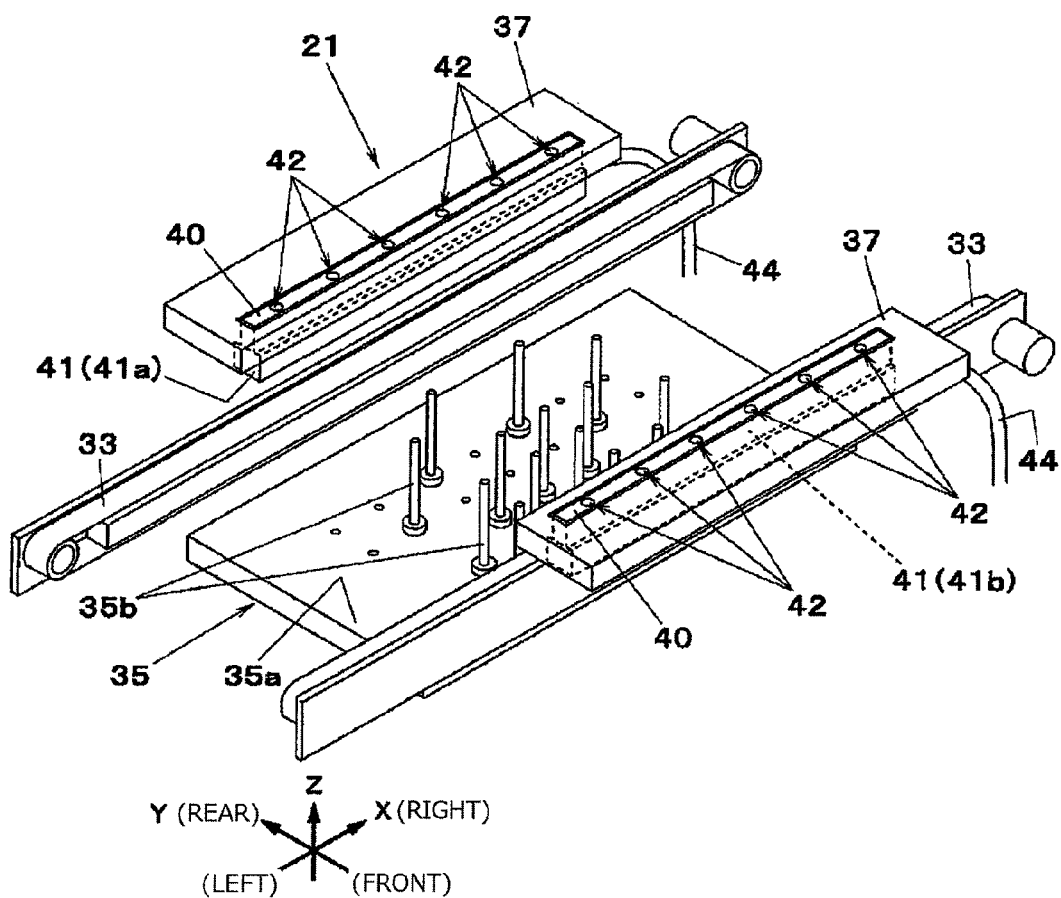
FIG. 6 is a perspective view of a substrate holding unit of the screen printer of the embodiment of the invention.
Figure 7:
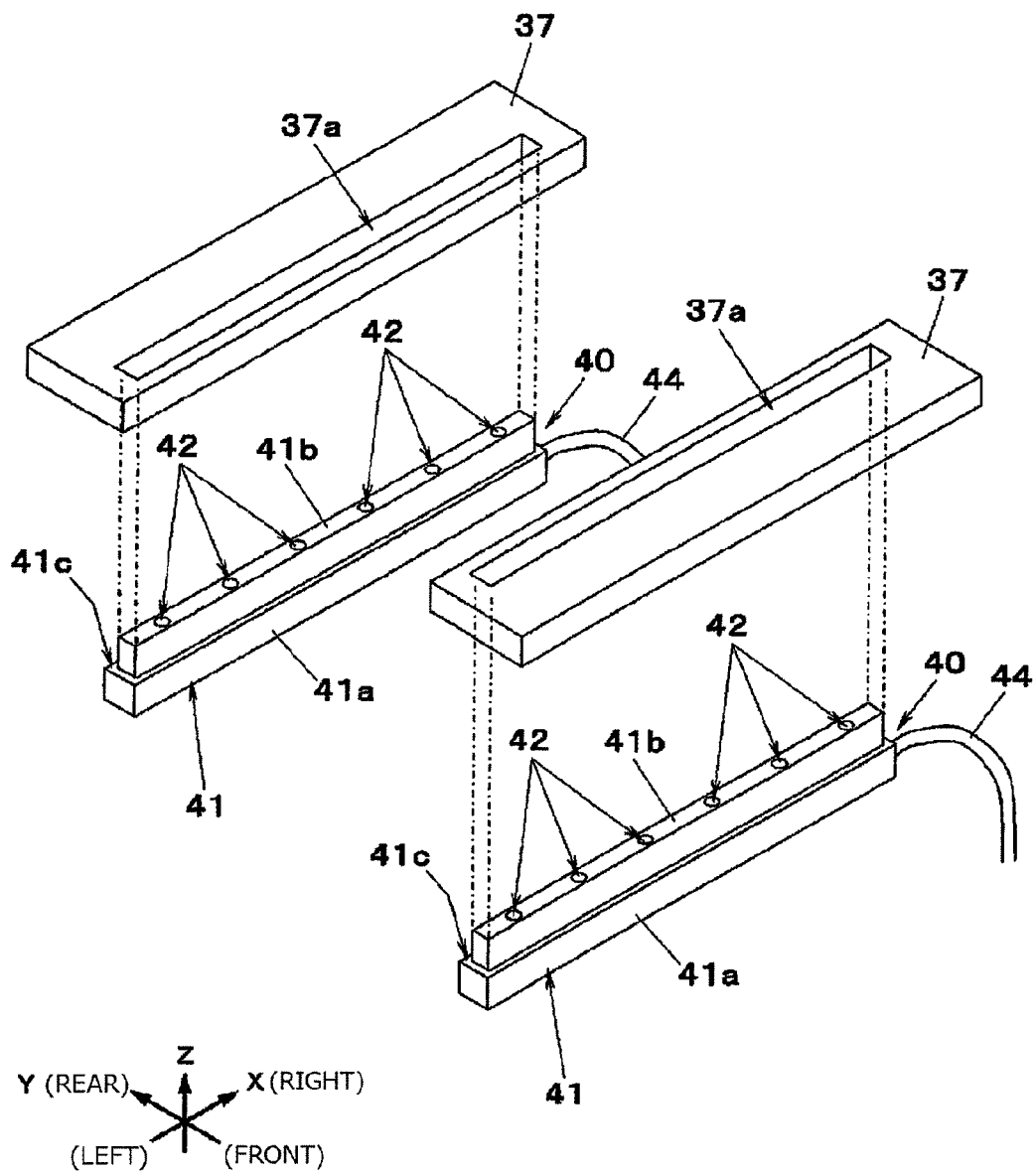
FIG. 7 is a partial exploded perspective view of the substrate holding unit of the embodiment of the invention.
Figure 8A:
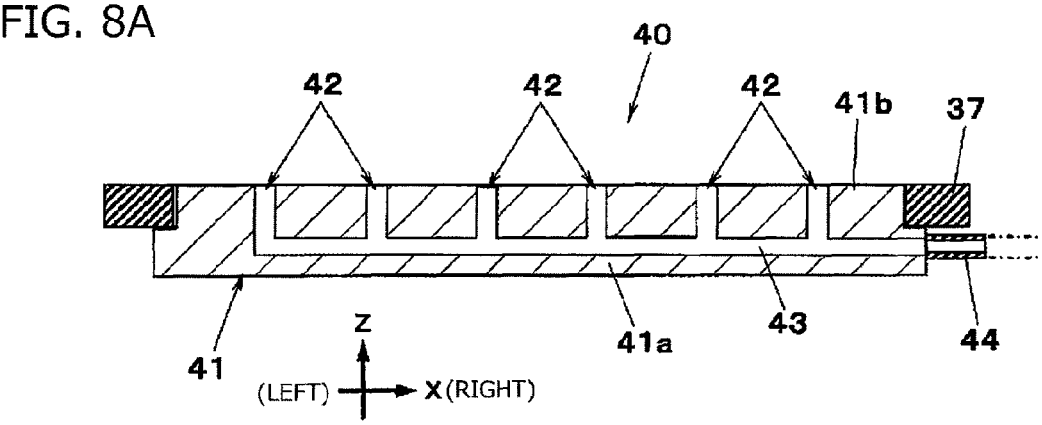
FIG. 8A is a cross-sectional view and FIG. 8B is an exploded cross-sectional view showing a mask suction portion of the embodiment of the invention together with a clamping member.
Figure 8B:
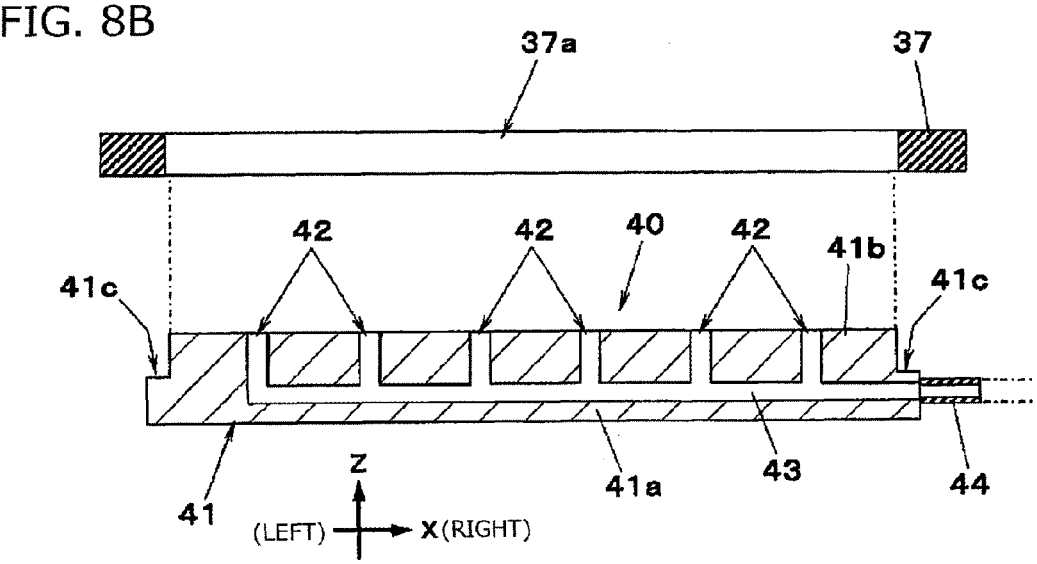

In FIG. 6, each clamping member 37 is provided with a mask suction portion 40. As shown in FIGS. 7, 8A, and 8B, the mask suction portion 40 has a block body 41 which is formed of a base portion 41a provided to extend in the X-axis direction and a rectangular insertion portion 41b provided to extend upward from the base portion 41a. The block body 41 is attached to the clamping member 37 so that the insertion portion 41b is inserted from the lower side into a rectangular vertical through hole 37a formed in the clamping member 37 to contact a contacting surface 41c formed on an upper surface of the base portion 41a with a lower surface of the clamping member 37. The block body 41 has a suction path 43 formed therein, and a plurality of suction openings 42 connected to the suction path 43 is formed on an upper surface of the insertion portion 41b. The suction path 43 is connected to a suction pipe line 44 extending from the outside of the block body 41, and when a vacuum pressure is supplied into the suction path 43 through the suction pipe line 44, a suction force is generated in each suction opening 42. The upper surface of the insertion portion 41b is positioned in the same plane as an upper surface of the clamping member 37 in a state in which the block body 41 is attached to the clamping member 37 (in a state in which the contacting surface 41c contacts with the lower surface of the clamping member 37).

In FIG. 5A, in a state in which the base table 35a is positioned at the above-described first position (a height of H1), an upper end of the lower receiving pin 35b of the lower receiving portion 35 is positioned lower than a transport surface S of the substrate 2 transported by the conveyors 33. In such a state, the conveyors 33 receive the substrate 2 from the feeding conveyor 14 and transport the received substrate 2 in the X-axis direction to position the substrate 2 at a predetermined clamping position (FIG. 5A). When the conveyors 33 position the substrate 2 at the clamping position, the elevation actuator 34 pushes the lower receiving portion 35 upward (the arrow A shown in FIG. 5B), and the lower receiving portion 35 lifts the substrate 2 in a state of supporting (receiving from below) the substrate 2 to separate the substrate 2 from the conveyors 33. When the elevation actuator 34 pushes the base table 35a upward up to the second position (a height of H2) (FIG. 5B), the clamping members 37 clamp the substrate 2 at the sides (Y-axis direction) (the arrow B shown in FIG. 5B). In a state in which the clamping of the substrate 2 by the clamping members 37 completes, the upper surface of the substrate 2 and the upper surfaces of the clamping members 37 are at the same height.

In this embodiment, the substrate holding unit 21 clamps and holds the substrate 2 at the sides by the pair of clamping members 37 below the mask 13.

When the clamping members 37 clamp the substrate 2, the substrate holding unit moving mechanism 22 pushes the substrate holding unit 21 upward (the arrow C1 shown in FIG. 5C). Accordingly, the substrate 2 contacts with the mask 13 (FIG. 5C) as the base table 35a is positioned at the third position (a height of H3). After the substrate 2 contacts with the mask 13, the substrate holding unit moving mechanism 22 further moves the substrate holding unit 21 up to slightly push the mask 13 upward, and then moves the substrate holding unit 21 down to position the base table 35a at a height of H3. Accordingly, the substrate 2 closely contacts with the mask 13 securely.

In FIGS. 3 and 4, the printing head 16 is provided with two squeegees 52 opposed to each other in the Y-axis direction below a moving base 51 provided to extend in the X-axis direction. The printing head moving mechanism 16M has two printing head moving ball screws 16a which extend in the Y-axis direction and are screwed into right and left end portions of the moving base 51, and two printing head moving motors 16b which rotate and drive the two printing head moving ball screws 16a. When the two printing head moving ball screws 16a are rotated in synchronization with each other by the two printing head moving motors 16b, the moving base 51 is moved in the Y-axis direction. Each of the two squeegees 52 is separately moved up and down below the moving base 51 by a squeegee elevation cylinder 53 provided in the moving base 51.

In FIGS. 3 and 4, the camera unit 18 has an upper imaging camera 18a of which an imaging visual field is directed upward and a lower imaging camera 18b of which an imaging visual field is directed downward. The camera unit moving mechanism 18M is formed of an XY-table mechanism, and a moving plate 18p to which the camera unit 18 is attached is moved in the horizontal plane.

The paste supply syringe 17 stores a paste Pst therein, and emits and supplies the paste to the lower side. In FIGS. 2 and 4, the paste supply syringe 17 is attached to a syringe base 51a which is freely moved in the X-axis direction along the moving base 51. The paste supply syringe 17 is moved in the Y-axis direction together with the squeegees 52 by the movement of the moving base 51 in the Y-axis direction, and is moved in the X-axis direction by the movement of the syringe base 51a in the X-axis direction. Therefore, the paste supply syringe 17 is freely moved in the X-Y plane, and thus the paste Pst can be supplied to an arbitrary region on the mask 13.

Figure 9:
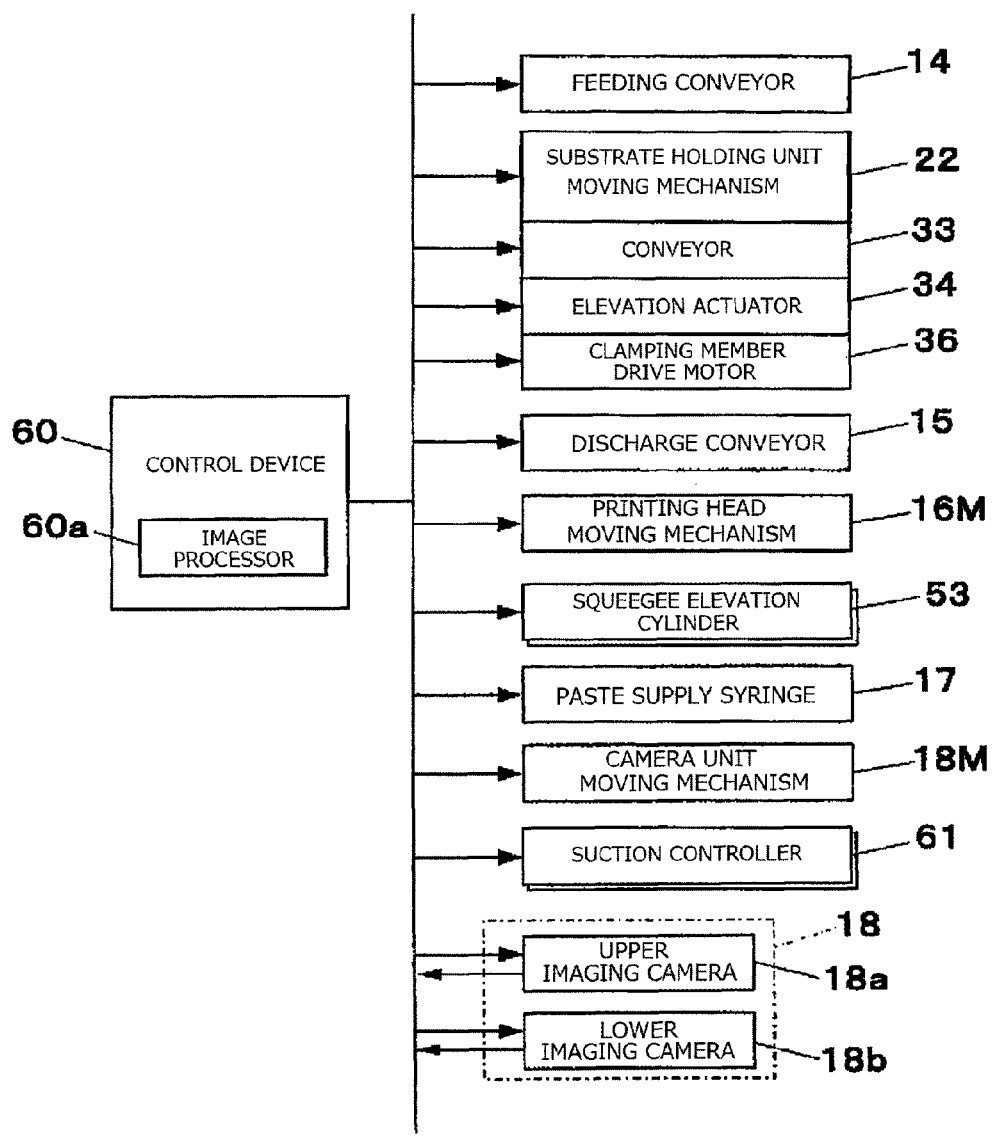
FIG. 9 is a block diagram showing a control system of the screen printer of the embodiment of the invention.

In FIG. 9, a control device 60 of the screen printer 5 controls the operation of feeding the substrate 2 by the feeding conveyor 14, the operation of moving the substrate 2 to the clamping position by the conveyors 33, the operation of moving the lower receiving portion 35 up and down by the elevation actuator 34, the clamping operation of the clamping members 37 by the clamping member drive motor 36, the operations of moving the substrate holding unit 21 in the horizontal plane and of moving the substrate holding unit 21 up and down by the substrate holding unit moving mechanism 22, and the operation of discharging the substrate 2 by the discharge conveyor 15. The control device 60 also controls the operation of moving the printing head 16 in the Y-axis direction by the printing head moving mechanism 16M, the operation of moving each squeegee 52 up and down by the squeegee elevation cylinder 53, the operation of emitting the paste Pst by the paste supply syringe 17, and the operation of moving the camera unit 18 in the horizontal plane by the camera unit moving mechanism 18M. In addition, the control device 60 operates a suction controller 61 connected to the above-described two suction pipe lines 44 to control the supply of a vacuum pressure to the mask suction portions 40.

In FIG. 9, the upper imaging camera 18a images the mask-side marks 13m provided in the mask 13 under the control of the control device 60. The lower imaging camera 18b images the substrate-side marks 2m of the substrate 2 held by the substrate holding unit 21 under the control of the control device 60. Both image data obtained through the imaging of the upper imaging camera 18a and image data obtained through the imaging of the lower imaging camera 18b are input to the control device 60 and subjected to an image process in an image processor 60a of the control device 60. The control device 60 calculates a position of each mask-side mark 13m based on the obtained image of the mask-side mark 13m, and calculates a position of each substrate-side mark 2m based on the obtained image of the substrate-side mark 2m.

Next, procedures for execution of screen printing by the screen printer 5 (screen printing method) will be described using FIGS. 5A, 5B, 5C, 10A, 10B, 11A, 11B, and 11C. When the control device 60 detects the sending of the substrate 2 from the substrate supply portion 4, the substrate 2 is received by the feeding conveyor 14 to be positioned at the clamping position (FIG. 5A), and the control device 60 operates the elevation actuator 34 to move the lower receiving portion 35 up so that the lower receiving portion 35 supports the substrate 2 from below and the base table 35a is positioned at the first position. In addition, the control device 60 operates the clamping member drive motor 36 to clamp and hold the substrate 2 at the sides by the clamping members 37 (FIG. 5B; the arrow B shown in FIG. 5B; substrate holding process). After clamping the substrate 2 by the clamping members 37, the control device 60 moves the camera unit 18 by the camera unit moving mechanism 18M to image the mask-side marks 13m of the mask 13 by the upper imaging camera 18a in order to recognize the position of the mask 13, and to image the substrate-side marks 2m by the lower imaging camera 18b in order to recognize the position of the substrate 2.

After recognizing the positions of the mask-side marks 13m and the substrate-side marks 2m, the control device 60 matches the mask-side marks 13m and the substrate-side marks 2m based on the result of the recognition when viewed from above, and moves the substrate holding unit 21 up by the substrate holding unit moving mechanism 22 (the arrow C1 shown in FIG. 5C) to contact the substrate 2 held by the substrate holding unit 21 with the lower surface of the mask 13 (FIG. 5C; contact process). Accordingly, the electrodes 2a of the substrate 2 and the pattern holes 13P formed on the mask 13 are matched.

In this embodiment, the substrate holding unit moving mechanism 22 moves the substrate holding unit 21 which holds the substrate 2 to contact the substrate 2 with the lower surface of the mask 13.

After contacting the substrate 2 with the mask 13, the control device 60 controls the suction controller 61 to supply a vacuum pressure into the suction paths 43 of the two mask suction portions 40 and to generate a suction force in each suction opening 42 of the mask suction portions 40, thereby sucking the lower surface of the mask 13 to the two mask suction portions 40. Accordingly, the mask 13 closely contacts with the clamping members 37, and the position of the mask 13 is fixed with respect to the substrate 2 clamped by the clamping members 37.

After sucking the mask 13 to the two mask suction portions 40 and closely contacting the mask 13 with the clamping members 37 as described above, the control device 60 performs an examination to confirm whether the amount of the paste Pst remaining on the mask 13 is sufficient by a paste amount confirming device (not shown). When it is determined that the amount of the paste Pst remaining on the mask 13 is not sufficient, the paste supply syringe 17 supplies the paste Pst to the mask 13.

When determining that the amount of the paste Pst remaining on the mask 13 is sufficient as a result of the confirmation of the paste amount (when the paste supply syringe 17 supplies the paste Pst, the confirmation of the paste amount is performed thereafter), the control device 60 fills, with the paste Pst, the pattern holes 13P of the mask 13 contacted with the substrate 2 (paste filling process). Specifically, the control device 60 moves one squeegee 52 down by the squeegee elevation cylinder 53 (the arrow D1 shown in FIG. 10A) to contact the squeegee 52 with the mask 13, and then moves the moving base 51 (that is, printing head 16) in the Y-axis direction (the arrow E shown in FIG. 10A) to move (slide) the squeegee 52 on the mask 13. Through the squeezing, the paste Pst is scraped on the mask 13 and fills the pattern holes 13P of the mask 13.

In this embodiment, the squeegee 52 is a paste filling unit that fills the pattern holes 13P with the paste Pst on the mask 13 by sliding on the mask 13 contacted with the substrate 2 moved by the substrate holding unit moving mechanism 22.

Figure 10A:
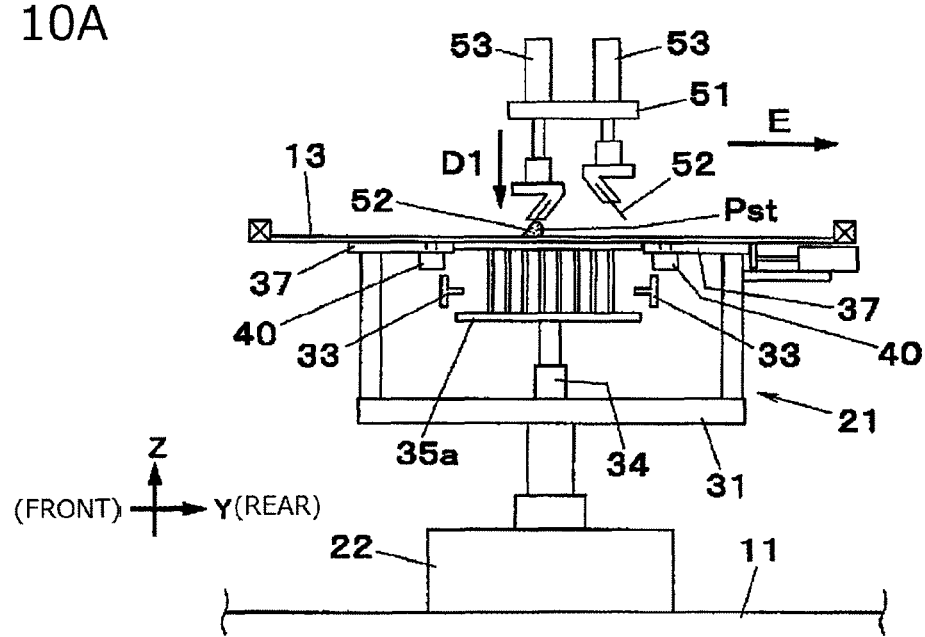
FIGS. 10A and 10B are diagrams illustrating operations of the screen printer of the embodiment of the invention.
Figure 10B:
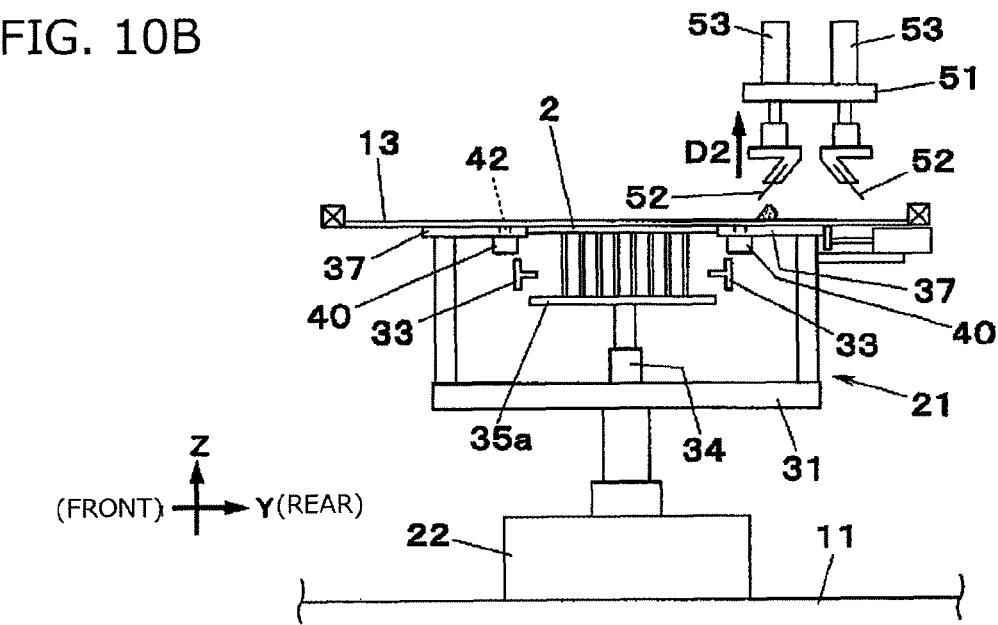

After moving the printing head 16 and filling the pattern holes 13P of the mask 13 with the paste Pst, the control device 60 operates the squeegee elevation cylinder 53 to move the squeegee 52 up (the arrow D2 shown in FIG. 10B). The control device 60 operates the substrate holding unit moving mechanism 22 to move the elevation plate 31 down (the arrow C2 shown in FIG. 11B) to thus move the substrate 2 in a direction away from the mask 13 (here, downward direction), thereby performing plate releasing (FIG. 11A to FIG. 11B to FIG. 11C; plate releasing process).

Figure 11A:
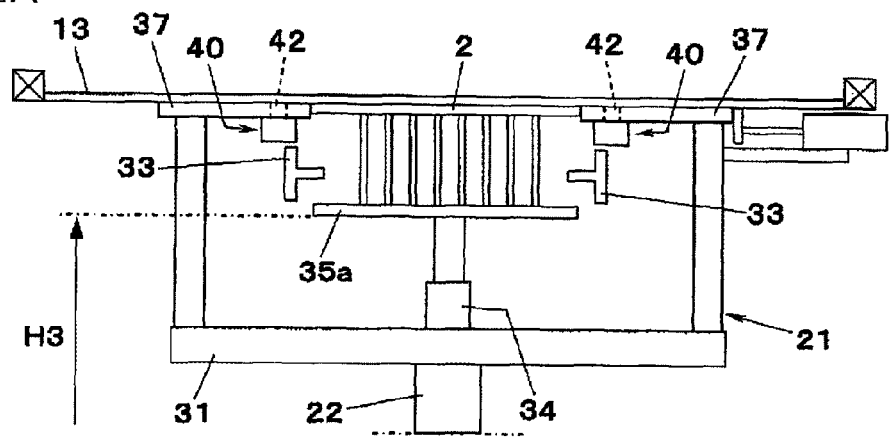
FIGS. 11A, 11B, and 11C are diagrams illustrating operations of the screen printer of the embodiment of the invention.
Figure 11B:
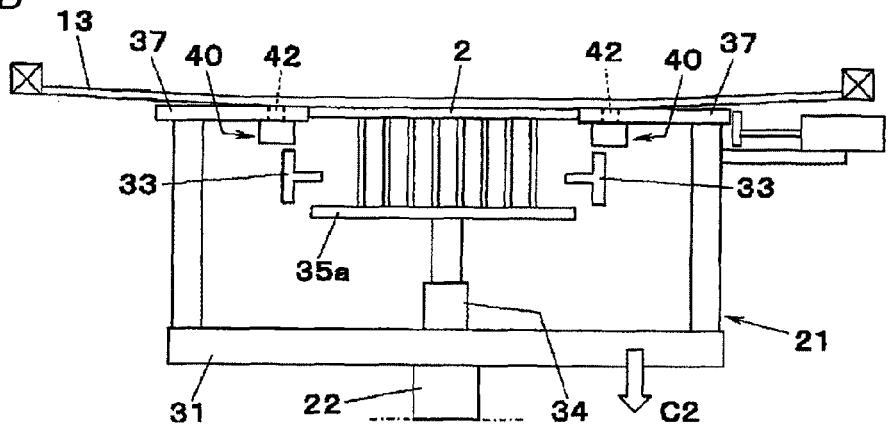
Figure 11C:
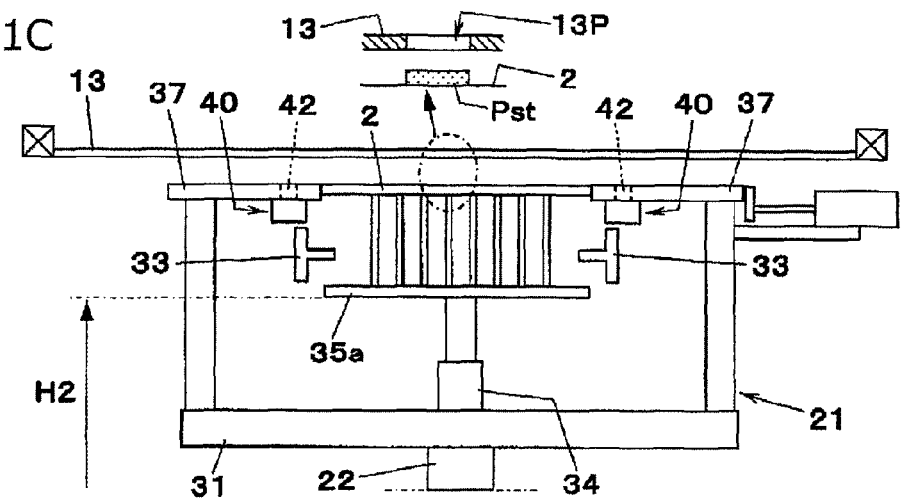

In the plate releasing, the control device 60 continues the supply of a vacuum pressure to the mask suction portions 40 from the suction controller 61 from when the plate releasing is started to when the substrate holding unit 21 (that is, substrate 2) is moved down by a predetermined amount, thereby keeping the suction state of the mask 13 by the mask suction portions 40 (FIG. 11A to FIG. 11B). As the substrate holding unit 21 is moved down by the predetermined amount, the supply of a vacuum pressure to the mask suction portions 40 from the suction controller 61 is blocked (the suction paths 43 are opened to the atmosphere) and the suction state of the mask 13 by the mask suction portions 40 is released. Accordingly, since the mask 13 returns to its original posture (horizontal posture) while maintaining the posture (horizontal posture) parallel to the substrate 2 (FIG. 11C), the paste Pst hardly loses its shape in a central portion of the substrate 2 and also in an end portion of the substrate 2 (see the enlarged view of FIG. 11C). Here, the "predetermined amount" is an arbitrary value within a range where a state in which, after the movement of the substrate 2 is started, the mask sucked to the mask suction portions 40 maintains a posture parallel to the substrate 2 is maintained.

In this embodiment, in the plate releasing process, when the substrate 2 is moved in the direction away from the mask 13, the mask suction portions 40 provided in the pair of clamping members 37 keep sucking the mask 13, and, after the movement of the substrate 2 is started, the suction of the mask 13 to the mask suction portions 40 is released in a state in which the mask 13 sucked to the mask suction portions 40 maintains the posture parallel to the substrate 2. In this embodiment, the control device 60 is a control unit that controls the mask suction portions 40 to keep sucking the mask 13 when the substrate holding unit moving mechanism 22 moves the substrate 2 in a direction away from the mask 13 (moves the substrate 2 down), and to release, after the movement of the substrate 2 is started, the suction of the mask 13 to the mask suction portions 40 in a state in which the mask 13 sucked to the mask suction portions 40 maintains the posture parallel to the substrate 2.

After the end of the screen printing per one substrate 2, the control device 60 releases the clamping of the substrate 2 by opening the clamping members 37, and then operates the elevation actuator 34 to move the lower receiving portion 35 down to thus place the substrate 2 on the conveyors 33. At this time, the lower receiving portion 35 is moved down until the base table 35a is positioned at the first position having a height of H1.

After placing the substrate 2 on the conveyors 33 as described above, the control device 60 operates the conveyors 33 and the discharge conveyor 15 in conjunction with each other to discharge the substrate 2 to another device (component mounting machine 6) on the downstream process side from the screen printer 5. After discharging the substrate 2, the control device 60 determines whether there is another substrate 2 to be subjected to the screen printing. As a result, when there is another substrate 2 to be subjected to the screen printing, the substrate 2 is fed by the feeding conveyor 14, and when there is no substrate 2 to be subjected to the screen printing, a series of operations ends.

In FIG. 1, the component mounting machine 6 is provided with a substrate transport lane 72 on a base 71, a plurality of part feeders 73 as a component supply portion, and two mounting heads 75 which are moved by a head moving mechanism 74 formed of an XY-robot. The substrate transport lane 72 receives and feeds the substrate 2 on which the paste Pst is printed by the screen printer 5 from the discharge conveyor 15 of the screen printer 5, and positions the substrate 2 at a predetermined position. Each of the two mounting heads 75 picks up a component 3 supplied from each part feeder 73 and mounts the component 3 on the substrate 2 positioned by the substrate transport lane 72. When the mounting of the component 3 on the substrate 2 ends, the substrate transport lane 72 is operated to discharge the substrate 2 to the outside (downstream process side).

In the screen printer 5 (screen printing method) of this embodiment, when the substrate 2 is moved in the direction away from the mask 13 after the pattern holes 13P of the mask 13 contacted with the substrate 2 are filled with the paste Pst, the mask 13 is sucked to the mask suction portions 40 provided in the clamping members 37, and after the movement of the substrate 2 is started, the suction of the mask 13 to the mask suction portions 40 is released in a state in which the mask 13 sucked to the mask suction portions 40 maintains a posture parallel to the substrate 2. Accordingly, since the mask 13 is separated from the substrate 2 in a state of maintaining the parallel posture, the paste Pst can be prevented from losing its shape in the plate releasing, and good printing accuracy can be secured.

In the above-described embodiment, as the paste filling unit that fills the pattern holes 13P of the mask 13 with the paste Pst, a type of unit that scrapes the paste Pst on the mask 13 (squeegees 52) is shown. However, the paste filling unit is not limited to the type of unit that scrapes the paste Pst on the mask 13. A type of unit that directly emits and supplies the paste Pst accommodated therein to the pattern holes 13P of the mask 13 may be used. In addition, in the above-described embodiment, the mask suction portions 40 vacuum-suck the mask 13 by a vacuum pressure. However, an electromagnet which is energized and controlled by the control device 60 may be used to electromagnetically suck a mask made of a metal.

A screen printer, a component mounting line, and a screen printing method capable of securing good printing accuracy by preventing a paste from losing its shape in plate releasing are provided.

What is claimed is:

1. A screen printer comprising:
   a mask that has pattern holes formed thereon;
   a substrate holding unit that clamps and holds a substrate at sides by a pair of clamping members below the mask;
   a substrate holding unit moving mechanism that moves the substrate holding unit holding the substrate to contact the substrate with a lower surface of the mask;
   a paste filling unit that fills, with a paste, the pattern holes of the mask contacted with the substrate by the substrate holding unit moving mechanism;
   mask suction portions that are provided in the pair of clamping members and that suck the mask being contacted with the substrate; and
   a control unit that controls the mask suction portions to keep sucking the mask when the substrate holding unit moving mechanism moves the substrate in a direction away from the mask to perform plate releasing after the pattern holes of the mask are filled with the paste, and to release the suction of the mask in a state in which the mask sucked to the mask suction portions maintains a posture parallel to the substrate after the movement of the substrate is started.

2. The screen printer according to claim 1, wherein the mask suction portions suck the mask through vacuum suction or electromagnetic suction.

3. A component mounting line comprising:
   the screen printer according to claim 1; and
   a component mounting machine that mounts a component on the substrate on which the paste is printed by the screen printer.

4. A screen printing method comprising:
   a substrate holding step of clamping and holding a substrate at sides by a pair of clamping members below a mask having pattern holes formed thereon;
   a contact step of contacting the substrate clamped and held by the clamping members with a lower surface of the mask;
   a paste filling step of filling, with a paste, the pattern holes of the mask contacted with the substrate; and
   a plate releasing step of performing plate releasing by moving the substrate in a direction away from the mask after the pattern holes of the mask are filled with the paste,
   wherein in the plate releasing step, when the substrate is moved in the direction away from the mask, mask suction portions provided in the pair of clamping members keep sucking the mask, and, after the movement of the substrate is started, the suction of the mask to the mask suction portions is released in a state in which the mask sucked to the mask suction portions maintains a posture parallel to the substrate.

\* \* \* \* \*